US008035915B2

(12) United States Patent
Kotani et al.

(10) Patent No.: US 8,035,915 B2
(45) Date of Patent: Oct. 11, 2011

(54) MAGNETIC DISK DRIVE HAVING CIRCUIT BOARD APERTURES FITTED WITH PROTRUSIONS TO ACHIEVE EFFICIENT LAYOUT OF CIRCUIT ELEMENTS

(75) Inventors: Yasuhiro Kotani, Kanagawa (JP); Akira Morita, Kanagawa (JP); Hiroki Kitahori, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 726 days.

(21) Appl. No.: 11/317,510

(22) Filed: Dec. 22, 2005

(65) Prior Publication Data
US 2006/0139812 A1   Jun. 29, 2006

(30) Foreign Application Priority Data

Dec. 28, 2004   (JP) .................................. 2004-379431

(51) Int. Cl.
*G11B 5/012* (2006.01)
(52) U.S. Cl. ..................................................... 360/97.01
(58) Field of Classification Search ......................... None
See application file for complete search history.

(56) References Cited

U.S. PATENT DOCUMENTS

| | | | | |
|---|---|---|---|---|
| 5,025,335 A * | 6/1991 | Stefansky | .................... | 360/97.01 |
| 5,392,176 A * | 2/1995 | Anderson | .................... | 360/97.01 |
| 5,502,604 A * | 3/1996 | Furay | .......................... | 360/97.01 |
| 5,551,145 A * | 9/1996 | Jurgenson | .................. | 29/603.03 |
| 5,657,183 A * | 8/1997 | Ycas et al. | .................. | 360/97.01 |
| 5,673,157 A * | 9/1997 | Ycas et al. | .................. | 360/97.01 |
| 5,751,514 A * | 5/1998 | Hyde et al. | .................. | 360/97.01 |
| 5,768,049 A * | 6/1998 | Morehouse et al. | ........ | 360/97.01 |
| 5,808,830 A * | 9/1998 | Stefansky et al. | ........... | 360/97.01 |
| 5,880,904 A * | 3/1999 | Mizoshita et al. | .......... | 360/97.01 |
| 5,898,537 A * | 4/1999 | Oizumi et al. | ............. | 360/97.01 |
| 6,594,107 B2 * | 7/2003 | Hayakawa et al. | ......... | 360/97.01 |
| 6,597,531 B2 * | 7/2003 | Noda | .......................... | 360/97.01 |
| 7,274,533 B2 * | 9/2007 | Kimura et al. | .............. | 360/97.01 |
| 7,298,583 B2 * | 11/2007 | Miyazaki et al. | ........... | 360/97.01 |
| 2001/0006440 A1 * | 7/2001 | Noda | .......................... | 360/97.01 |
| 2003/0016468 A1 * | 1/2003 | Hayakawa et al. | ......... | 360/97.01 |
| 2005/0041326 A1 * | 2/2005 | Yoo | ............................. | 360/97.01 |
| 2005/0243459 A1 * | 11/2005 | Kimura et al. | ............. | 360/97.01 |
| 2005/0243460 A1 * | 11/2005 | Asano et al. | ............... | 360/97.01 |
| 2005/0264923 A1 * | 12/2005 | Kimura et al. | ............. | 360/97.01 |
| 2005/0264924 A1 * | 12/2005 | Kimura et al. | ............. | 360/97.01 |
| 2006/0002005 A1 * | 1/2006 | Miyazaki et al. | ........... | 360/97.01 |
| 2006/0023348 A1 * | 2/2006 | Tokizaki et al. | ............ | 360/97.01 |
| 2006/0028758 A1 * | 2/2006 | Sakurai et al. | ............. | 360/97.01 |
| 2006/0139795 A1 * | 6/2006 | Aoki | .......................... | 360/97.01 |

* cited by examiner

*Primary Examiner* — David D Davis

(57) ABSTRACT

Embodiments of the invention provide an efficient layout of circuit elements on a circuit board. A hard disk drive (HDD) according to one embodiment of the present invention is provided with a circuit board. The circuit board has an IC of HDC, MPU, and R/W channel, an IC of MDU, an SPM aperture, and a carriage bearing aperture. The IC is provided on the circuit board on the side where the center of a carriage bearing protrusion is positioned with respect to a central line AB parallel to the short sides of the surface of the housing and on the side opposite to the side where the center of the carriage bearing protrusion is positioned with respect to a central line CD parallel to the long sides of the surface of the housing. The IC of MDU is provided on the circuit board on the side where the center of the carriage bearing protrusion is positioned with respect to the central line CD and at a position between the center of an SPM protrusion and the center of the carriage bearing protrusion in the longitudinal direction of the surface of the housing.

15 Claims, 6 Drawing Sheets

MAGNETIC DISK DRIVE HAVING CIRCUIT BOARD APERTURES FITTED WITH PROTRUSIONS TO ACHIEVE EFFICIENT LAYOUT OF CIRCUIT ELEMENTS

CROSS-REFERENCES TO RELATED APPLICATIONS

This application claims priority from Japanese Patent Application No. JP2004-379431, filed Dec. 28, 2004, the entire disclosure of which is incorporated herein by reference.

BACKGROUND OF THE INVENTION

The present invention relates to a magnetic disk drive, and more particularly to a magnetic disk drive having an efficient layout of circuit elements on a circuit board.

Devices using various types of media such as optical disks and magnetic tapes are known in the art as recording media drives provided in the interior or the exterior of information processing apparatuses. Among them, hard disk drives (hereinafter referred to as HDDs) have become popular as storage devices for information processing apparatuses to such an extent that they are one type of the storage devices indispensable for today's information processing systems. Further, not limited to the information processing apparatuses as described above, HDDs are expanding more and more in application. For example, HDDs are used for moving picture recording/reproducing devices, car navigation systems, cellular phones, and removable memories for use in them.

Each magnetic disk used in HDDs has a plurality of tracks formed concentrically and each track is partitioned into a plurality of sectors. Sector address information and user data are stored in each sector. Either data write to a sector or data read from the sector is enabled by a magnetic head which accesses the desired sector according to the sector address information. A signal read out by the head from a magnetic disk through data read operation is subjected to waveform shaping, decoding processing and other prescribed signal processing by a signal processing circuit disposed on an HDD circuit board before being transmitted to the host. Likewise, data transferred from the host is subjected to prescribed signal processing by the signal processing circuit and then written to the magnetic disk.

Reducing the size of the HDD has heretofore been performed. For example, what is called a one inch type HDD (also called a 1.0 type HDD) using a magnetic disk of 26 to 28 mm in diameter) and a smaller size of a 0.85 inch type HDD have appeared on the market. These small-sized HDDs are implemented not only by the reduction in size of magnetic disks but also by the reduction in size of mechanical parts such as a spindle motor (SPM), an actuator, and a voice coil motor (VCM) and of signal processing circuits such as a hard disk controller (HDC) mounted on a circuit board.

Further, apertures are formed in a circuit board so as to thin these small-sized HDDs. Protrusions, which are formed on a housing for accommodating rotary shafts of SPM and actuator, are fitted in the apertures formed in the circuit board to complete assembly.

BRIEF SUMMARY OF THE INVENTION

At present the HDD has come to be mounted on small-sized portable information devices such as portable telephone terminals and a further reduction in size and thickness is desired. However, in a small-sized HDD, as noted above, apertures are formed in the circuit board for thinning purpose. Therefore it is necessary to dispose a circuit such as HDC in a limited region on the circuit board of the HDD and lay the required wiring. Thus, even if an attempt is made to further reduce the size of the foregoing small-sized HDD, a difficulty is encountered due to restriction in the layout of circuit elements on the circuit board.

The present invention has been accomplished in view of the above-mentioned problem and provides a magnetic disk drive capable of attaining an efficient layout of circuit elements on a circuit board and thereby attaining a further reduction of size.

A magnetic disk drive according to an aspect of the present invention comprises a housing having a first rectangular surface and first and second columnar protrusions formed on the first rectangular surface, and a circuit board having a first circuit, which constitutes a hard disk controller, an MPU, and a read/write channel, and a second circuit, which constitutes a motor drive unit, and provided with a first columnar aperture and a second columnar aperture. The center of the first protrusion lies on a center line parallel to the short sides of the first surface or at a position deviated from the center line, and the center of the second protrusion lies on a center line parallel to the long sides of the first surface or at a position deviated from the center line on the side opposite to the side where the center of the first protrusion is positioned with respect to the center line parallel to the short sides of the first surface. The circuit board is fixed to the first surface of the housing in a mutually fitted state of the first aperture and the first protrusion and in a mutually fitted state of the second aperture and the second protrusion. The center of the first circuit lies on the circuit board on the side where the center of the second protrusion is positioned with respect to the center line parallel to the short sides of the first surface and on the side opposite to the side where the center of second protrusion is positioned with respect to the center line parallel to the long sides of the first surface, and the center of the second circuit lies on the circuit board at a position between the center of the fist protrusion and the center of the second protrusion in the longitudinal direction of the first surface and on the side opposite to the side where the center of the first circuit is positioned with respect to the center line parallel to the long sides of the first surface. According to this construction it is possible to attain an efficient layout of circuit elements on the circuit board and therefore possible to reduce the size of the circuit board and hence of the magnetic disk drive.

The first circuit may be sealed within a square package, a connection wiring for connection with the second circuit may be provided on a first side of the package, the first side being close to the second aperture in a fixed state of the package to the circuit board, a connection wiring for connection with an external host may be provided on a second side of the package, the second side being perpendicular to the first side and close to the first aperture, and a connection wiring for connection with an arm electronic circuit formed within the housing may be provided on a third side of the package, the third side being opposed to the second side and close to an edge of the circuit board. According to this construction, it is possible to shorten the wiring length between circuits.

Test pads for the first circuit may be provided in a region on the circuit board to be positioned between an edge close to the first circuit in the longitudinal direction of the first surface and the first circuit. According to this construction, the size of the circuit board may be reduced even when such test pads are provided.

The second circuit may be sealed within a square package and may be disposed on the circuit board in such a manner that an extension line of an edge of the package intersects an edge of the first surface obliquely. According to this configuration, the second circuit is positioned efficiently on the circuit board region, which is a limited space between the first aperture and the second aperture. Thus, the size of the circuit board is further reduced.

Further, a connecting terminal for connection between the first circuit and an external host may be provided on the circuit board on the side where the center of the second aperture is positioned with respect to the center line parallel to the short sides of the first surface and on the side where the center of the second aperture is positioned with respect to the center line parallel to the long sides of the first surface.

A magnetic disk drive according to another aspect of the present invention comprises a housing having a first rectangular surface and first and second columnar protrusions formed on the first rectangular surface, and a circuit board having a first circular aperture. The center of the first protrusion lies on a center line parallel to the short sides of the first surface or at a position deviated from the center line, and the center of the second protrusion lies on a center line parallel to the long sides of the first surface or at a position deviated from the center line on the side opposite to the side where the center of the first protrusion is positioned with respect to the center line parallel to the short sides of the first surface. The circuit board is fixed to the first surface of the housing in a mutually fitted state of the first aperture and the second protrusion; a first circuit, which includes a hard disk controller, an MPU, a read/write channel, and a motor drive unit, is provided on the circuit board on the side where the center of the second protrusion is positioned with respect to the center line parallel to the short sides of the first surface and on the side opposite to the side where the center of the second protrusion is positioned with respect to the center line parallel to the long sides of the first surface; and a connecting terminal for connection between the hard disk controller and an external host is provided on the circuit board in the longitudinal direction of the first surface on the side where the center of the second protrusion is positioned with respect to the center of the first protrusion. According to this construction it is possible to attain an efficient layout of circuit elements on the circuit board and therefore possible to reduce the size of the circuit board and hence of the magnetic disk drive.

The circuit board may be provided so as to cover a part of the first surface. According to this construction, it is possible to reduce the size of the circuit board and hence possible to reduce the cost of the same board.

Preferably, the connecting terminal is disposed on the circuit board on the side where the center of the second aperture is positioned with respect to the center line parallel to the short sides of the first surface and on the side where the center of the second aperture is positioned with respect to the center line parallel to the long sides of the first surface.

According to such a layout of the connecting terminal, the circuit board may be provided so as to cover the first surface on only the side where the center of the second protrusion is positioned rather than the center of the first protrusion in the longitudinal direction of the first surface. As a result, the size of the circuit board may be further reduced.

The above magnetic disk drives according to the present invention may be 1.0 type HDDs. Further, the short sides of the first surface may each be about 30 mm long and the long sides thereof may each be about 40 mm long.

According to the present invention, it is possible to attain an efficient layout of circuit elements on the circuit board which constitutes the magnetic disk drive and reduce the size of the circuit board, whereby it becomes possible to attain the reduction in size of the magnetic disk drive.

DETAILED DESCRIPTION OF THE INVENTION

First Embodiment

An embodiment of the present invention will be described in detail hereinunder with reference to the drawings. The HDD of this embodiment is a one inch type HDD having a profile size of 30 mm long by 40 mm wide by 5 mm high and using a magnetic disk of 27.5 mm in diameter.

Figure 1:
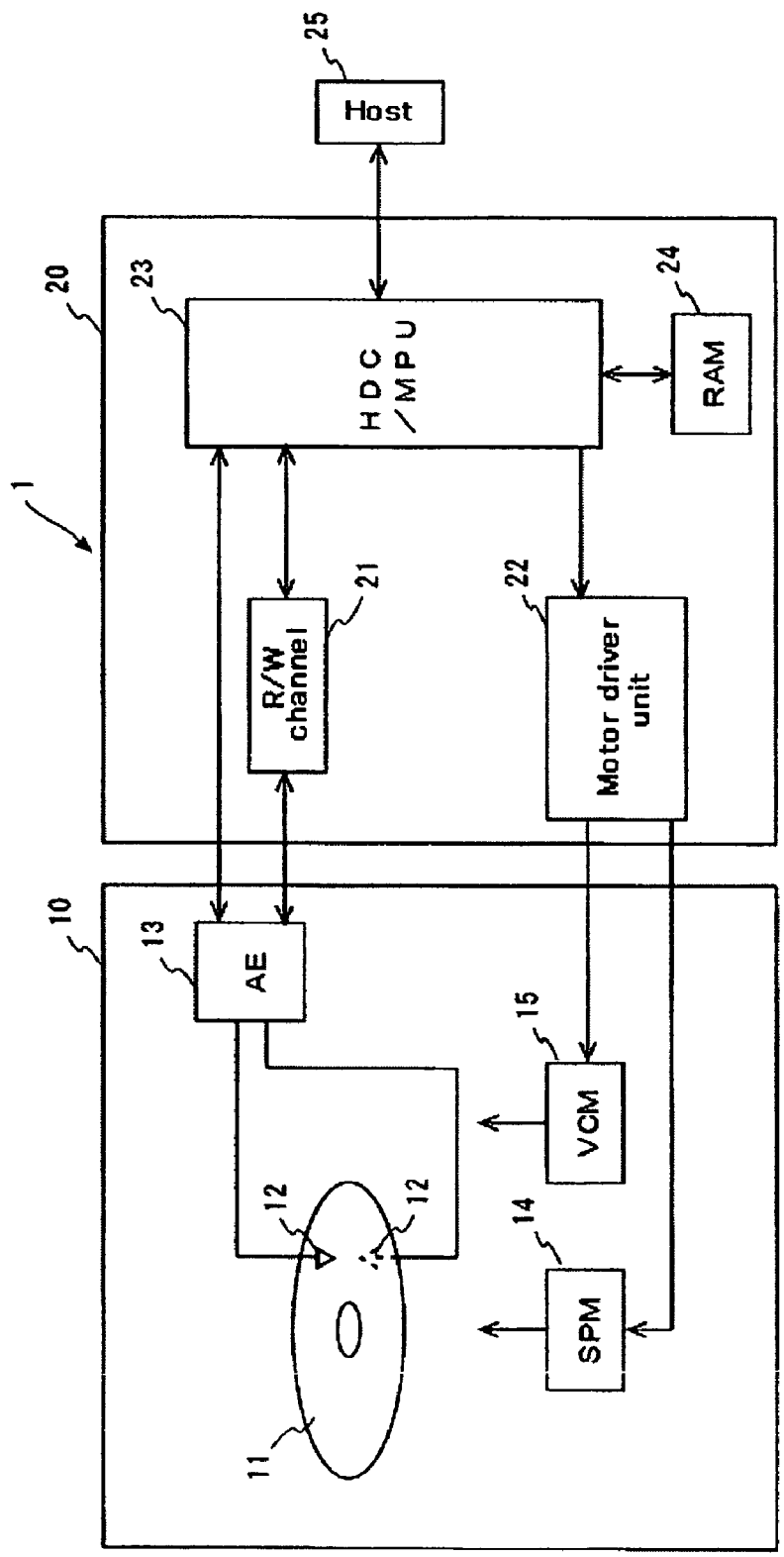
FIG. 1 is a block diagram showing a schematic structure of HDD 1 according to a first embodiment of the present invention.

FIG. 1 is a functional block diagram showing a schematic construction of HDD 1 according to this embodiment. As shown in FIG. 1, the HDD 1 includes, within a hermetically sealed housing 10, a magnetic disk 11 as an example of a recording medium, a head 12, an arm electronic circuit (arm electronics: AE) 13, a spindle motor (SPM) 14, and a voice coil motor (VCM) 15.

The HDD 1 further includes a circuit board 20 fixed to the outside of the housing 10. The circuit board 20 includes ICs respectively of a read/write channel (R/W channel) 21, a motor driver unit (MDU) 22, a hard disk controller (HDC)/MPU integrated circuit ("HDC/MPU" hereinafter) 23, and RAM 24 as an example of memory. These circuits may be integrated into a single IC or may be packaged dividedly as plural ICs.

Write date provided from a host 25 is received by the HDC/MPU 23 and is written to the magnetic disk 11 by the head 12 through R/W channel 21 and AE 13. On the other hand, data stored on the magnetic disk 11 is read by the head 12 and is outputted from the HDC/MPU 23 to the host 25 through AE 13 and R/W channel 21. The host 25 represents a high-order device such as a portable information device or PC, which gives instructions for the storage and read of data to the HDD 1.

Figure 2:
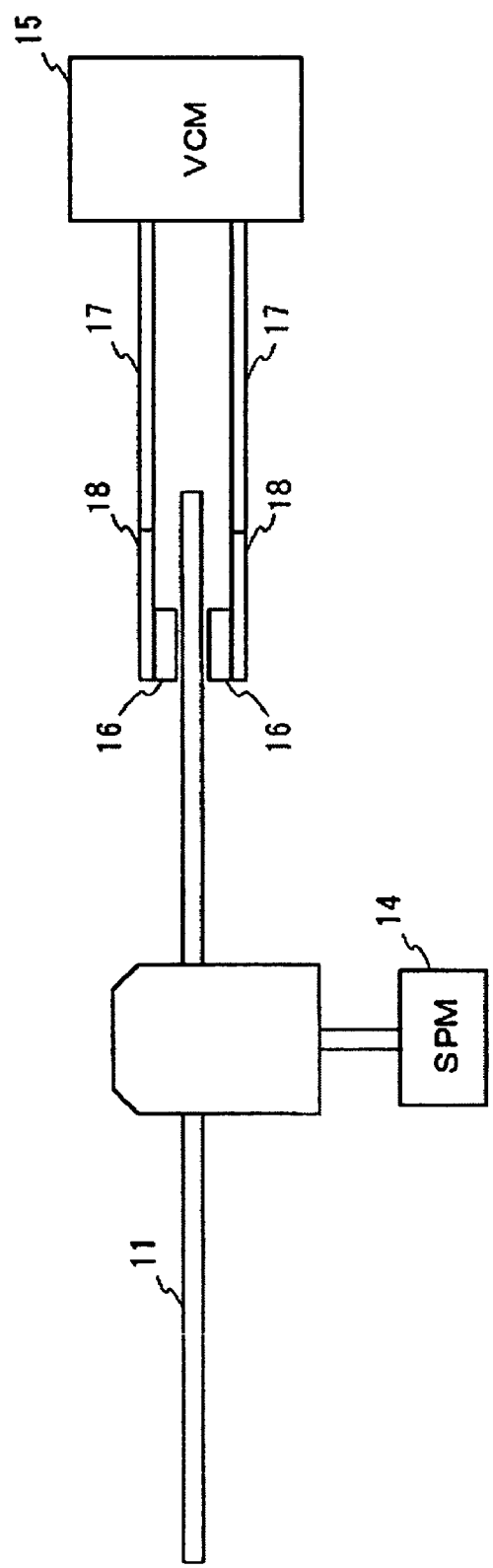
FIG. 2 schematically shows a drive mechanism for a magnetic disk and head elements in the first embodiment.

Next, a description will be given about constituent elements of the HDD1. First, with reference to FIG. 2, a drive mechanism for the magnetic disk 11 and head 12 will be outlined. The magnetic disk 11 is fixed to a hub of the SPM 14. The SPM 14 rotates the magnetic disk 11 at a predetermined speed. The motor driver unit 22 drives the SPM 14 in accordance with control data provided from HDC/MPU 23. Both surfaces of the magnetic disk 11 used in this embodiment are formed as data recording surfaces and heads 12 (see FIG. 1) corresponding respectively to the recording surfaces are provided.

Each head 12 (see FIG. 1) is fixed to a slider 16, which in turn is fixed to a front end of a suspension 18. A carriage 17 is fixed to the VCM 15. A pivotal motion of the VCM 15 moves the suspension 18, slider 16, and head 12. The motor driver unit 22 drives the VCM 15 in accordance with control data provided from the HDC/MPU 23.

For read or write of data from the magnetic disk 11, the carriage 17 moves the slider 16 and the head 12 up to a position over a data region on the surface of the rotating magnetic disk 11. With a pivotal motion of the carriage 17, the slider 16 and the head 12 move radially of the surface of the magnetic disk 11, whereby the head 12 may access a desired region.

The head 12 flies over the magnetic disk 11 through a certain gap as a result of balance between pressure, which is induced by the viscosity of air present between an ABS (Air Bearing Surface) of the slider 16 opposed to the magnetic disk 11 and the rotating magnetic disk 11, and force applied toward the magnetic disk 11 by the suspension 18.

Referring back to FIG. 1, a description will be given about circuit portions. The AE 13 selects one head 12 for data access from among plural heads 12, then preamplifies with a certain gain a read signal, which is read by a read head in the selected head 12, and sends it to the R/W channel 21. Further, the AE 13 sends a write signal provided from the R/W channel 21 to a write head in the selected head 12.

The R/W channel 21 performs a write processing for data transferred from the host 25. When data is to be fed to the host 25, the R/W channel 21 performs a read processing. In the write processing, the R/W channel 21 subjects write data fed from the HDC/MPU 23 to code modulation, then converts the code-modulated write data into a write signal (electric current), and provides the write signal to the AE 13. In the read processing, the R/W channel 21 amplifies a read signal provided from the AE 13 so that the read signal comes to have a certain amplitude, then extracts data from the acquired read signal, and subjects the data to decoding. The read data contains user data and servo data. The read data thus subjected to decoding is then fed to the HDC/MPU 23.

The HDC/MPU 23 is a circuit having MPU and HDC both integrated into a single chip. The MPU operates in accordance with a microcode loaded into RAM 24. Upon start-up of HDD 1, not only the microcode operating over the MPU but also data required for control and data processing are loaded from the magnetic disk 11 or ROM (not shown) into the RAM 24. The HDC/MPU 23 executes control of the entire HDD 1 in addition to such required data processing as positioning control for each head 12, interface control, and defect management.

The HDC/MPU 23 has a function of interfacing between it and the host 25 and receives user data and commands such as read command and write command transmitted from the host 25. The received user data is transferred to the R/W channel 21. As to data read from the magnetic disk 11 and acquired from the R/W channel 21, the HDC/MPU 23 transmits the data to the host 25. Further, as to user data acquired from the host 25 or read from the magnetic disk 11, the HDC/MPU 23 executes a processing for error correction (ECC).

The data read by the R/W channel 21 contains not only user data but also servo data. The HDC/MPU 23 performs a positioning control for the head 12 with use of the servo data. Control data provided from the HDC/MPU 23 is outputted to the motor driver unit 22, which in turn supplies a driving current to the VCM 15 in accordance with a control signal. The HDC/MPU 23 controls data read/write processing with use of the servo data.

Figure 3:
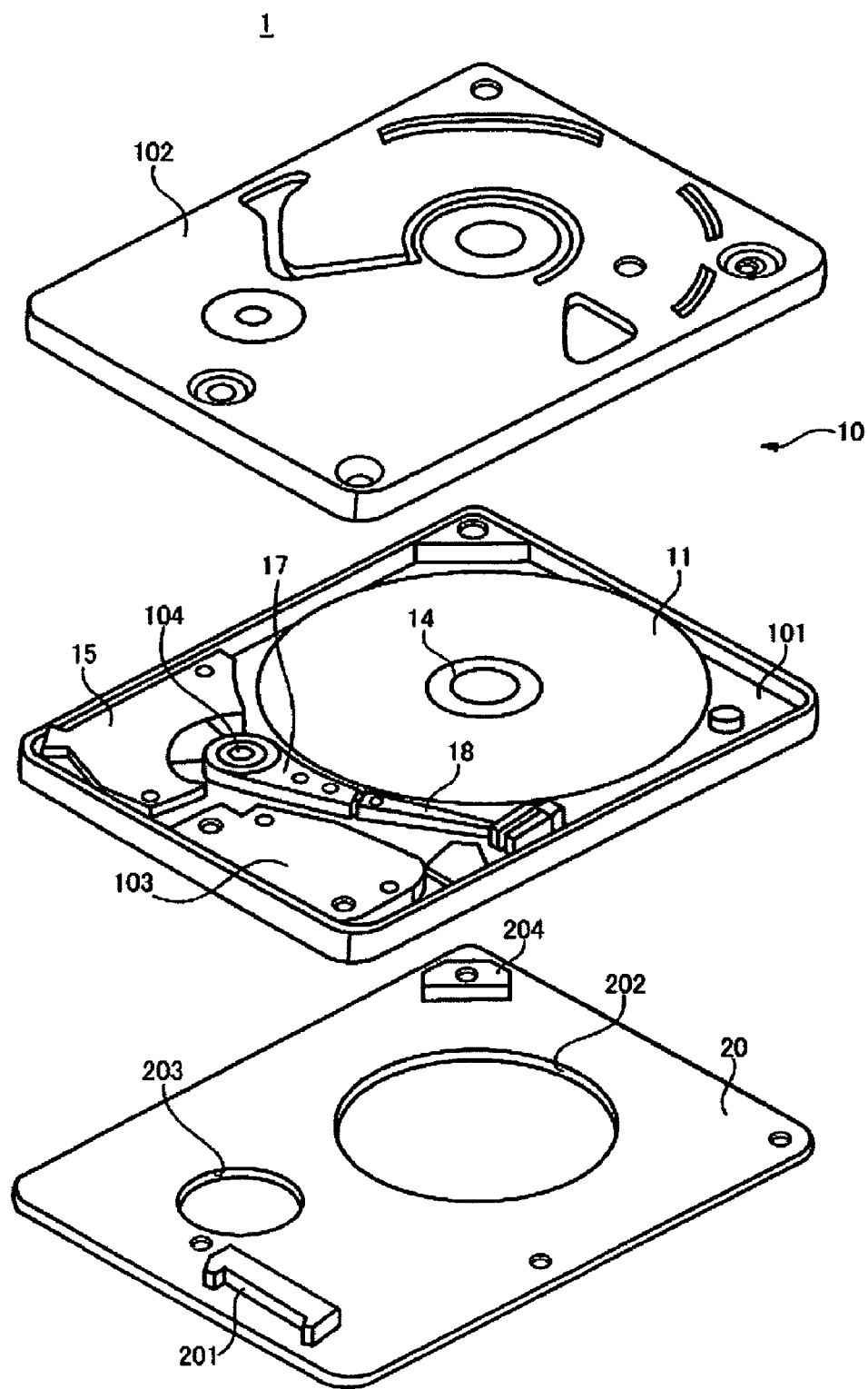
FIG. 3 is an exploded perspective view showing the structure of the HDD 1.

Next, a description will be given about a physical construction of the HDD 1 according to this first embodiment. FIG. 3 is an exploded perspective view of the HDD 1. The housing 10 is composed of a base 101 and a top cover 102. The base 101 accommodates such constituent parts as magnetic disk 11, heads 12 (not shown), SPM 14, VCM 15, and carriage 17. The base 101 and the top cover 102, which closes an upper opening of the base, are fixed together through a gasket (not shown) with the use of screws or the like, whereby the constituent parts may be accommodated in a hermetically sealed state.

The circuit board 20 includes wiring connectors 201 and 204. The wiring connector 201 electrically connects the R/W channel 21 on the circuit board 20 with the AE 13 in the housing 10. The wiring connector 204 electrically connects the MDU 22 on the circuit board 20 with the SPM 14 and VCM 15 in the housing 10. The R/W channel 21, MDU 22, and AE 13 are not shown in FIG. 3 because the R/W channel 21 and MDU 22 are disposed on the circuit board 20 on the side opposite to the surface where the wiring connector 201 is disposed and the AE 13 is disposed below a metallic plate 103 in the housing 10. Also regarding such ICs as HDC/MPU 23 and RAM 24, these are provided on the side opposite to the surface of the circuit board 20 in FIG. 3 as the R/W channel 21 and MDU 22.

The surface of the base 101 for connection with the circuit board 20 is not flat but is uneven. Particularly, the base 101 has a columnar SPM protrusion 105 (see FIG. 4) from which the SPM 12-fixed portion protrudes columnarly to the exterior of the housing 10 and a carriage bearing protrusion 106 (see FIG. 4) from which the bearing portion of the carriage 17 protrudes columnarly to the exterior. In order to reduce the thickness of the HDD 1 having such a shape of the base 101 and the circuit board 20 connected together, two apertures are formed in the circuit board 20. The HDD 1 is assembled as follows. The base 101 and the circuit board 20 are fixed together in such a manner that the SPM protrusion 105 on the base 101 is fitted in the SPM aperture 202 formed in the circuit board 20. The carriage bearing protrusion 106 is fitted in the carriage bearing aperture 203 formed in the circuit board 20. For example, screws are used to fix the base 101 and the circuit board 20 to each other.

Figure 4:
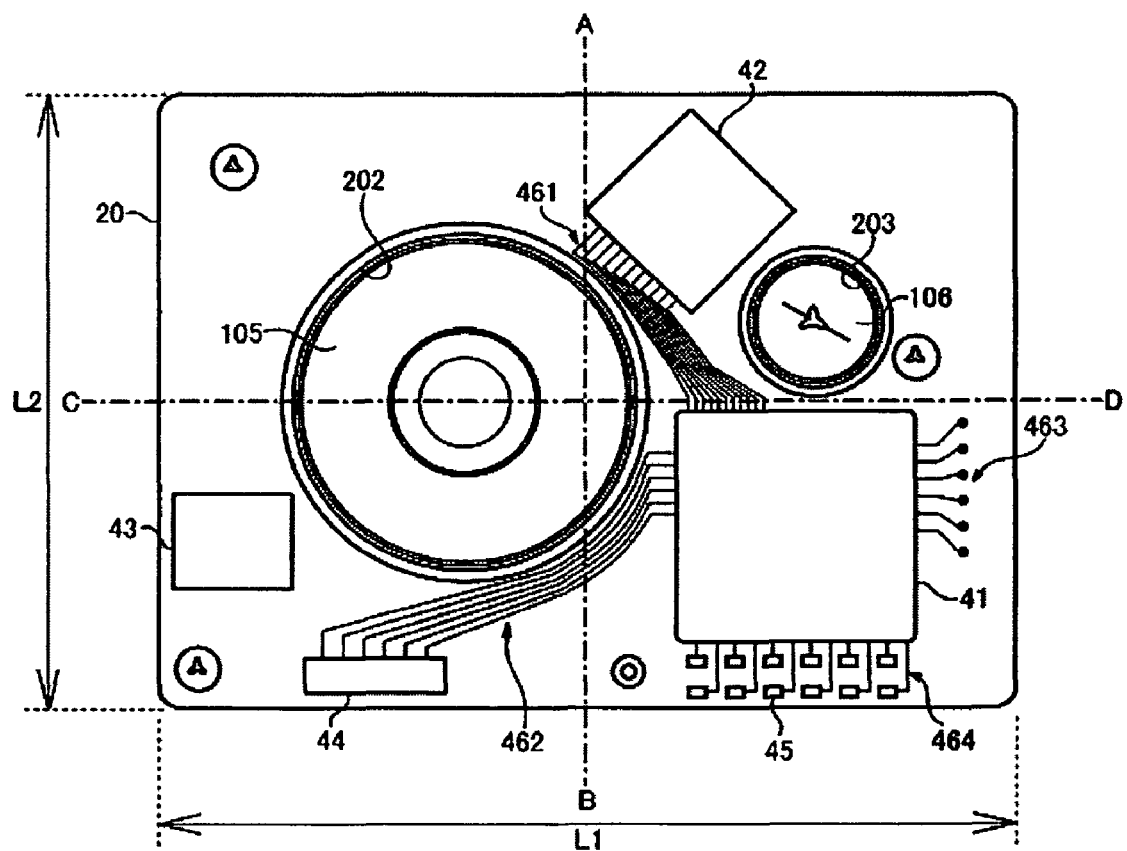
FIG. 4 is an appearance diagram of the HDD 1.

Now, with reference to FIG. 4, the following description is provided about the layout of ICs such as HDC/MPU 23 relative to the circuit board 20. FIG. 4 is an appearance view of the HDD 1 in an assembled state as seen from the circuit board 20 side.

The circuit board 20 is fixed so as to cover the rectangular surface of the base 101, which constitutes the housing 10. As shown in FIG. 4, the SPM aperture 202 and the carriage bearing aperture 203 both formed in the circuit board 20 are fitted with the two protrusions (SPM protrusion 105 and carriage bearing protrusion 106) formed on the base 101. The position of the SPM aperture 202 and that of the carriage bearing aperture 203 on the circuit board 20 are roughly determined by the restriction on the layout of constituent elements such as SPM 14 in the housing 10. More particularly, the center of the magnetic disk 11 is located on a center line bisecting the longitudinal direction of the housing 10, in other words, on a center line (the center line AB joining A and B in FIG. 4) parallel to the short sides of the rectangular surface of the base 101, or at a position deviated from the center line AB. This is for efficient arrangement of other constituent elements such as the carriage 16 and VCM 15 within the housing 10. The center of the SPM 14 is coincident with the center of the magnetic disk 11 and is therefore also located on the center line AB which bisects the housing 10 in the transverse direction or at a position deviated from the center line AB.

A pivot shaft 104 of the carriage 16 is disposed at a position deviated on the side opposite to the central position of the magnetic disk 11 and SPM 14 with respect to the center line AB, which bisects the housing 10 in the transverse direction. In the case where the longitudinal size of the housing 10 is below twice as large as the diameter of the magnetic disk 11 as a result of reduction in size of the HDD 1, the position of the SPM aperture 202 and that of the carriage bearing aperture 203 on the circuit board 20 inevitably follow such a layout. Further, the carriage 16 and the VCM 15 are accommodated efficiently within the housing 10. The pivot shaft 104 is disposed on a center line bisecting the transverse direction of the housing 10, in other words, a center line (the center line CD joining C and D in FIG. 4) parallel to the longitudinal sides of the rectangular surface of the base 101, or at a position deviated from the center line CD.

The position of the SPM aperture 202 and that of the carriage bearing aperture 203 on the circuit board 20 are determined by the restriction on the layout of such constituent elements as SPM 14 and pivot shaft 104 in the housing 10. That is, as shown in FIG. 4, the center of the SPM aperture 202 is located on the center line AB, which bisects the longitudinal direction of the housing 10, or at a position deviated from the center line AB. The center of the carriage bearing aperture 203 is located at a deviated position on the side opposite to the central position of the SPM aperture 202 with respect to the center line AB and on the center line CD, which bisects the transverse direction of the housing 10, or at a position deviated from the center line CD.

As a result of such a layout of the SPM aperture 202 and the carriage bearing aperture 203, a relatively large substrate region is present on the circuit board 20 on the side where the center of the carriage bearing aperture 203 is positioned with respect to the center line AB and is not positioned with respect to the center line CD, that is, in the right lower portion of the circuit board 20 in FIG. 4.

Main circuits disposed on the circuit board 20 are R/W channel 21, MDU 22, HDC/MPU 23, and RAM 24. As described earlier, these circuits may be integrated into a single IC or divided into plural ICs. As other elements, ROM, which stores microcodes, etc., a wiring connector for connection between the host 25 and the HDC/MPU 23, and a capacitor, are disposed on the circuit board 20. The arrangement of the R/W channel 21, MDU 22, and HDC/MPU 23, which are large in IC size and whose layout are greatly restricted, poses a problem to reduce the size of the circuit board 20.

The circuit board 20 used in this embodiment as shown in FIG. 4 disposes an IC 41 in the relatively large substrate region located on the right lower side in FIG. 4. More specifically, the IC 41 is disposed in such a manner that its center lies at a deviated position opposite to the central position of the SPM aperture 202 with respect to the center line AB, which bisects the longitudinal direction of the housing 10, and opposite to the central position of the carriage bearing aperture 203 with respect to the center line CD, which bisects the transverse direction of the housing 10.

An IC 42 is disposed in such a manner that in the longitudinal direction of the housing 10 its center is positioned between the center of the SPM aperture 202 and the center of the carriage bearing aperture 203, while in the transverse direction of the housing 10 its center is positioned between an edge of the circuit board 20 and the center of the carriage bearing aperture 203. The edge lies on the side where the center of the carriage bearing aperture 203 is positioned, The IC 41 is an integrated circuit of R/W channel 21, HDC/MPU 23, and RAM 24. The IC 41 may be constructed such that all of its functions are integrated onto a single silicon chip by the SoC (System on a Chip) technique. Alternatively, bare chips having the functions of R/W channel 21, HDC/MPU 23, and RAM 24 may be sealed in a single package by the technique called MCM (Multi-Chip Module). Such a packaging is advantageous in that the package size and the wiring between ICs are reduced and the wiring distance becomes shorter in comparison with the case where a plurality of individual IC packages are arranged. On the other hand, the IC 42 has the function of MDU 22.

Preferably, as shown in FIG. 4, one corner of the IC 42 package is inserted between the SPM aperture 202 and the carriage bearing aperture 203 so that two sides of the thus-inserted IC 42 package are positioned close to the SPM aperture 202 and the carriage bearing aperture 203. In other words, the IC 42 is preferably disposed so that an extension line of an edge of the square package of IC 42 intersects an edge of the circuit board 20 obliquely. More specifically, the IC 42 is preferably disposed in such a manner that the angle between an extension line of an edge of the square package of IC 42 and the center line AB in the transverse direction of the circuit board 20 becomes about 45°. According to this arrangement, even in the case where the SPM aperture 202 and the carriage bearing aperture 203 are in proximity to each other, the IC 42 may be disposed efficiently. The region between the SPM aperture 202 and the carriage bearing aperture 203 is utilized and it becomes possible to reduce the transverse side of the circuit board 20.

Figure 6:
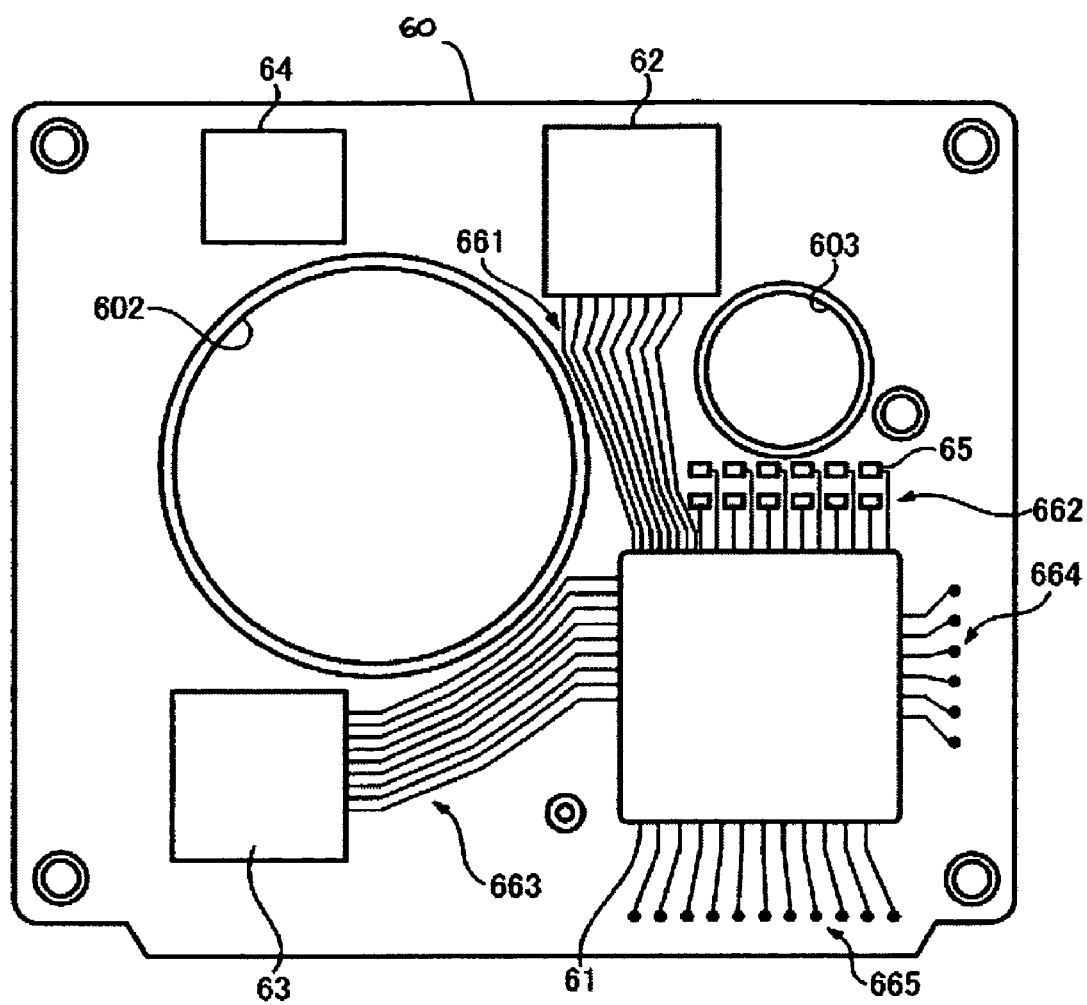
FIG. 6 shows a circuit board used in a conventional HDD.

For example in a circuit board 60 having a depth of about 35 mm and a width of about 40 mm, such an arrangement as shown in FIG. 6 has heretofore been adopted. More particularly, an IC 61 as an integration of HDC/MPU 23 and RAM 24 is disposed at a position corresponding to IC 41 on the circuit board 20, while an IC 62 of R/W channel 21 is disposed at a position corresponding to IC 42 on the circuit board 20. Further, an IC 63 of MDU 22 is disposed at a position at which its center is included in a substrate region below an SPM aperture 602 in FIG. 6. The substrate region below the SPM aperture 602 indicates a substrate region included in the range where the SPM aperture 602 is provided in the transverse direction of the circuit board 60. Such a disposition of the IC 63 at a position below the SPM aperture 602 has heretofore been possible because there is a margin in the transverse length of the circuit board. An IC 64 is a ROM, which stores microcodes, etc., and is disposed at a position above the SPM aperture 602.

As compared with such a conventional arrangement, in the circuit board 20 used in this embodiment, the R/W channel 21, HDC/MPU 23, and RAM 24 are integrated as IC 41 into a single package, and ICs 41 and 42 are arranged efficiently. More particularly, since the R/W channel 21, MDU 22, and HDC/MPU 23 are large in size, these circuit elements are arranged efficiently so that their centers are not positioned in the substrate regions above and below the SPM aperture 202 in FIG. 4. The substrate regions above and below the SPM aperture 202 indicate substrate regions included in the range where the SPM aperture 202 is provided in the transverse direction of the circuit board 20. Such a circuit arrangement makes it possible to greatly reduce the transverse size of the circuit board 20, which has been about 35 mm in the case of the conventional circuit board referred to above.

Profile dimensions of the one inch type HDD 1 thus implemented by the circuit board 20 are 40 mm wide (L1 in FIG. 4), 30 mm deep (L2 in FIG. 4), and 5 mm high. The size of 30 mm is an appropriate and minimum size taking productivity, etc. into account in case of using a magnetic disk 11 having a diameter of 27.5 mm. The size of 40 mm is an appropriate and minimum size necessary for accommodating HDD and other mechanical parts within the housing 10 in case of using a magnetic disk 11 having a diameter of 27.5 mm. Thus, the above dimensions of 30 mm deep by 40 mm wide by 5 mm high are an example and may be made still smaller, e.g., about 29 mm in depth and about 39 mm in width, depending on the layout design in the interior of the housing 10. Conversely, as a result of taking productivity into account, there sometimes is a case where a little larger size of HDD is adopted, e.g., 31 mm in depth and 41 mm in width, while adopting an appropriate circuit layout of the circuit board 20.

In addition to the above ICs 41 and 42, a ROM 43, which stores microcodes, etc., a wiring connector 44 for connection between the host 25 and the IC 41, and a capacitor (not shown), are arranged on the circuit board 20. Since the sizes of these parts are smaller than the sizes of ICs 41 and 42, their layout freedom on the circuit board 20 is high. Therefore, these parts may be arranged in allowable regions on the circuit board 20 taking such a factor as the length of wiring for the ICs 41 and 42 into account. Connection between the host 25 and the IC 41 may be performed such that wiring is connected directly to the circuit board without using the wiring connector 44. In short, a connecting terminal for connection with the host 25 is provided at the position concerned.

A description will now be given about the wiring layout for the circuit board 20. As the wiring length increases, the wiring load increases under the influence of parasitic inductance and parasitic capacitance, resulting in a signal delay time becoming longer, and therefore it is preferable that the wiring length be short. From this standpoint, for the circuit board 20 used in this embodiment, the circuit layout shown in FIG. 4 was adopted and wiring was laid in the following manner.

Wiring 461 for connection with the IC 42 as MDU 22 is provided on a first side of the package of IC 41, which is close to the carriage bearing aperture 203. Likewise, wiring 462 connected to the wiring connector 44 for connection with the host is provided on a second side of the package of IC 41, which is perpendicular to the first side and close to the SPM aperture 202. Wiring 463 connected to the wiring connector 201 for electric connection of AE 13 in the housing 10 is provided on a third side of the package of IC 41, which is parallel to the second side and close to an edge of the circuit board 20. Further, wiring 464 connected to plural test pads 45 formed on an end portion of the circuit board 20 is provided on a fourth side of the package of IC 41, which is parallel to the first side and close to an edge of the circuit board 20. Although the wirings 461 to 464 are schematically shown in FIG. 4, these wirings are usually laid in the form of multilayer interconnection on the surface of the circuit board 20. As the case may be, they are provided on the substrate surface opposite to the side where the ICs 41 and 42 are arranged.

The circuit board 60 of about 35 mm in depth by about 40 mm in width referred to above as a conventional example may dispose IC 61 at a position corresponding to IC 41 on the circuit board 20. In addition, the circuit board 60 may provide plural test pads 65 for the test of HDC/MPU 23 on the circuit board at a position between the IC 61 and a carriage bearing aperture 603. Further, the following wirings have been provided in IC 61. Wiring 661 for connection with IC 62 as R/W channel 21 and wiring 662 for connection with the test pads 65 are provided on a first side of the package of IC 61, which is close to the carriage bearing aperture 603. Wiring 663 for connection with IC 63 as MDU 22 is provided on a second side of the package of IC 61, which is perpendicular to the first side and close to the SPM aperture 602. Wiring 664 for electric connection of AE 13 is provided on a third side of the package of IC 61, which is parallel to the second side and close to an edge of the circuit board 60. Further, wiring 665 for connection with the external host 25 is provided on a fourth side of the package of IC 61, which is parallel to the first side and close to an edge of the circuit board 60.

In the case where test pads 65 are provided on the circuit board at a position between the IC 61 and the carriage bearing aperture 603 as in the conventional circuit board 60, there has been the problem that the layout of the test pads 65 restricts the reduction in size of the circuit board 60. In contrast therewith, in the circuit board 20 used in the HDD 1 of this embodiment, the wiring 462 for connection with the host 25 is shifted to the second side of IC 41 and test pads 45 are provided in an empty region created on the fourth side of the IC 41, so that the IC 41 may be disposed closer to the carriage bearing aperture 203. According to this layout it is possible to reduce the longitudinal size of the circuit board 20 and attain the reduction in size of the HDD 1.

In the above description, the IC 41 as a single package with R/W channel 21, HDC/MPU 23, and RAM 24 sealed therein is disposed on the circuit board 20. However, it is not always necessary to integrate these circuits into a single package. The R/W channel 21, HDC/MPU 23, and RAM 24 may be packaged separately and arranged as separate IC packages insofar as they may be provided in the region where IC 41 is disposed.

Further, although the circuit board 20 has been described above as having a rectangular shape equal to the rectangular surface shape of the housing 10, it is not always necessary for the circuit board 20 to be rectangular. What is important in the present invention is that the surface area of the circuit board may be diminished. In case of fixing the circuit board 20 to the surface of the housing 10 on which the SPM protrusion 105 and the carriage bearing protrusion 106 are formed, a consideration is given to the layout of the protrusion of the SPM 14 and the protrusion of the bearing portion of the carriage pivot shaft 104 or to the layout of the SPM aperture 202 and the carriage bearing aperture 203 for engagement with those protrusions. Then, the ICs 41 and 42 are arranged efficiently. Thus, the shape of the portion not influencing the layout of the ICs 41 and 42, wiring connector 44, test pads 45, and wirings 461 to 464 may be changed to a shape other than the rectangular shape, that is, the present invention is applicable also to the case where the shape of the circuit board 20 is not the rectangular shape.

Second Embodiment

Figure 5:
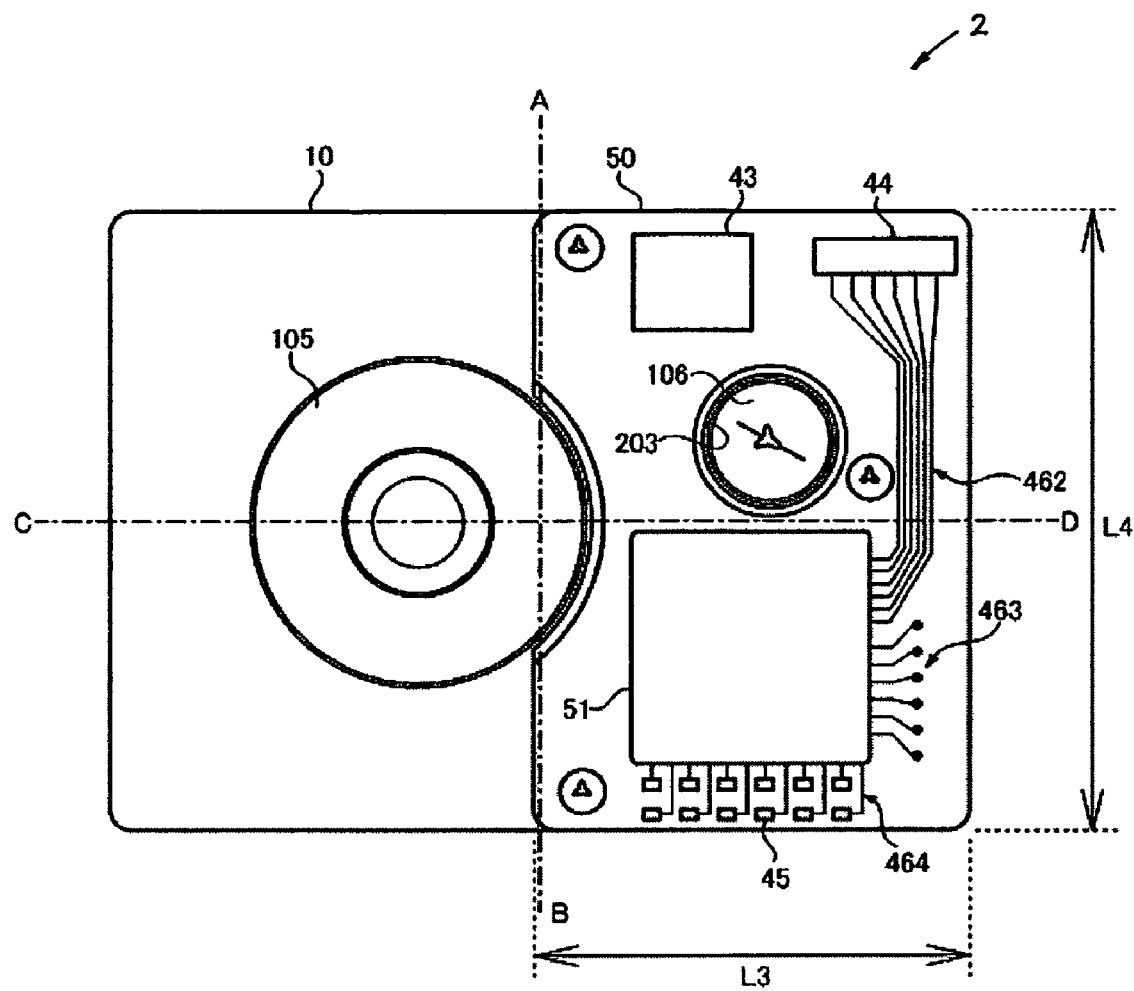
FIG. 5 is an appearance diagram of HDD 2 according to a second embodiment of the present invention.

The appearance of an HDD 2 according to this second embodiment is shown in FIG. 5, which is an appearance diagram of the HDD 2 as seen from a circuit board 50 side. The HDD 2 is characterized by having a circuit board 50 whose width is half of the width of the circuit board 20 used in the HDD 1 of the first embodiment. A description will be given below about the circuit board 50. The structure and constituent elements of a housing 10 of the HDD 2 are common to those of the housing 10 used in the HDD 1 of the first embodiment. Other constituent elements common to those of the HDD 1 of the first embodiment are also identified by the same reference numerals as in the first embodiment and explanations thereof will be omitted.

ICs 51, 43, and 44 and test pads 45 are arranged on the circuit board 50. A carriage bearing aperture 203 is formed in the circuit board 50 at the same position as in the circuit board 20.

The IC 51 is a single package IC incorporating MDU 22 in addition to R/W channel 21, HDC/MPU 23, and RAM 24. For example, the IC 51 may be formed by sealing bare chips having the functions of R/W channel 21, MDU 22, HDC/MPU 23, and RAM 24 in a single package by the SiP (System in a Package) technique. The IC 51 is disposed on the circuit board 50 in a region corresponding to the IC 41-disposed region on the circuit board 20. More specifically, the IC 51 is disposed in such a manner that its center lies at a deviated position opposite to the center of the carriage bearing aperture 203 with respect to a central line bisecting the transverse direction of the surface of the housing 10, in other words, a central line (the central line CD joining C and D in FIG. 4) parallel to the long sides of the rectangular surface of the base 101.

The IC 43 is a ROM storing microcodes, etc. The IC 43 is disposed on the circuit board 50 in a region corresponding to the region where the IC 42 of MDU 22 is disposed on the circuit board 20. More particularly, the IC 43 is disposed so as to be positioned, in the longitudinal direction of the surface of the housing 10, between the center of the SPM protrusion 105 and the center of the carriage bearing aperture 203 and, in the transverse direction of the surface of the housing 10, between an edge of the circuit board 50 on the side where the center of the carriage bearing aperture 203 is positioned and the center of the carriage bearing aperture 203.

A wiring connector 44 for connection with the host 25 is disposed in a right upper region on the circuit board 50 in FIG. 5. A more detailed description will now be given about the layout of the wiring connector 44. In the transverse direction of the surface of the housing 10, the wiring connector 44 is disposed on the side where the center of the carriage bearing aperture 203 is positioned relative to the center line CD. In the longitudinal direction of the surface of the housing 10, the wiring connector 44 is positioned between an edge of the circuit board 50 on the side where the center of the carriage bearing aperture 203 is positioned and the IC 43. It is optional whether the wiring connector 44 is to be disposed along a transverse edge of the housing 10 or along a longitudinal edge of the housing 10, as shown in FIG. 5.

The test pads 45 are positioned as is the case with the circuit board 20. Other parts, including a capacitor, (not shown) may be arranged in an allowable region on the circuit board 50 while taking such a factor as the length of wiring with IC 51 into account.

Taking the wiring with IC 51 into account, the IC 43 of ROM and the wiring connector 44 may be replaced with each other in their arrangement. In the longitudinal direction of the housing 10, the IC 43 of ROM and the wiring connector 44 are positioned in an empty region on the circuit board 50 on the side where the center of the carriage bearing aperture 203 is positioned.

The wiring connector 44 may be disposed on the right side of IC 51 in FIG. 5, that is, in the region between an edge of the circuit board 50 close to IC 51 and the IC 51. However, as is the case with the circuit board 20, it is preferable that the connection wiring 463 for the AE 13 in the housing 10 be disposed in the region on the circuit board 50. Since input/output analog signals for the magnetic disk 11 are transferred between the AE 13 and the IC 51, the wiring length should be shortened for avoiding the influence of noise, etc. As shown in the exploded view of FIG. 3, the AE 13 in the housing 10 is positioned just under the IC 51 or the wiring 463 in an assembled state of the HDD 2 shown in FIG. 5. Therefore, the wiring 463 is disposed in the region in question, and it is possible to shorten the wiring length between the IC 51 and the AE 13. Thus, it is preferable that the wiring connector 44 be disposed in the circuit board region on the side where the center of the carriage bearing aperture 203 is positioned in the transverse direction of the housing 10.

Like the HDD 1 of the first embodiment, profile dimensions of the one inch type HDD 2 implemented by the above layout of the circuit board 50 are 40 mm in width (L1), 30 mm in depth (L2), and 5 mm in height. Dimensions of the circuit board 50 are 20 mm in width (L3 in FIG. 5) and 30 mm in depth (L4 in FIG. 5). The HDD 2 is advantageous over the HDD 1 of the first embodiment in that the cost of the circuit board may be reduced by further diminishing the area of the circuit board.

The IC 51 may also be constructed as a single IC package incorporating the function of the ROM 43 in addition to the functions of the HDC/MPU 23, R/W channel 21, and RAM 24. In this case, the IC 42 of MDU 22 may be disposed at the same position as in the circuit board 20. Even according to this construction, it is possible to further diminish the area of the circuit board and hence reduce the cost of the same board in comparison with the HDD 1 of the first embodiment.

Although in the above description the R/W channel 21, HDC/MPU 23, RAM 24, and MDU 22 are sealed into a single package and the resulting IC 51 is disposed on the circuit board 50, it is not always necessary to seal these circuits into a single package. Further, although in the above description the circuit board 50 has a rectangular shape, which covers half of the rectangular surface of the housing 10, the shape of the circuit board 50 is not always limited to such a concrete shape. What is important in the present invention is that the circuits of R/W channel 21, MDU 22, HDC/MPU 23, and RAM 24 are provided in the region where IC 51 is disposed and the wiring connector 44 is disposed efficiently, whereby the surface area of the circuit board 50 may be made smaller than that of the housing 10. Thus, the shape of the circuit board 50 is not limited to the above concrete shape. The R/W channel 21, HDC/MPU 23, RAM 24, and MDU 22 may be packaged separately into separate ICs.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:
1. A magnetic disk drive comprising:
a housing having a first rectangular surface and first and second columnar protrusions formed on the first rectangular surface; and
a rectangular circuit board having two sets of parallel edges and a first circuit which includes a hard disk controller, an MPU, and a read/write channel, and a second circuit housed within a package and which includes a motor drive unit, and provided with a first columnar aperture and a second columnar aperture;
wherein the center of the first protrusion lies on a short side center line parallel to the short sides of the first surface or at a position deviated from the short side center line,
wherein the center of the second protrusion lies on a long side center line parallel to the long sides of the first surface or at a position deviated from the long side center line on the side opposite to the side where the center of the first protrusion is positioned,
wherein the circuit board is fixed to the first surface of the housing in a mutually fitted state of the first aperture and the first protrusion and in a mutually fitted state of the second aperture and the second protrusion,
wherein the center of the first circuit lies on the circuit board on the side where the center of the second protrusion is positioned with respect to the short side center line parallel to the short sides of the first surface and on the side opposite to the side where the center of the second protrusion is positioned with respect to the long side center line parallel to the long sides of the first surface, and wherein the center of the second circuit lies on the circuit board at a position between the center of the first protrusion and the center of the second protrusion in the longitudinal direction of the first surface and on the side where the center of the second protrusion is positioned with respect to the long side center line parallel to the long sides of the first surface, wherein the second circuit is disposed on the circuit board in such a manner that an extension line in a direction of a straight edge of the package intersects one of the edges of the circuit board obliquely.

2. The magnetic disk drive according to claim 1, wherein the first protrusion is for accommodating a spindle motor within the housing, while the second protrusion is for accommodating a bearing portion of a rotary shaft of an actuator within the housing.

3. The magnetic disk drive according to claim 1, wherein the first circuit is sealed within a square package; wherein a connection wiring for connection with the second circuit is provided on a first side of the package, the first side being close to the second aperture in a fixed state of the package to the circuit board; wherein a connection wiring for connection with an external host is provided on a second side of the package, the second side being perpendicular to the first side and close to the first aperture; and wherein a connection wiring for connection with an arm electronic circuit formed within the housing is provided on a third side of the package, the third side being opposed to the second side and close to an edge of the circuit board.

4. The magnetic disk drive according to claim 1, wherein test pads for the first circuit are provided in a region on the circuit board to be positioned between an edge close to the first circuit in the longitudinal direction of the first surface and the first circuit.

5. The magnetic disk drive according to claim 1, wherein a single connecting terminal for connection between the first circuit and an external host is provided on the circuit board on the side where the center of the second aperture is positioned with respect to the short side center line parallel to the short sides of the first surface and on the side where the center of the second aperture is positioned with respect to the long side center line parallel to the long sides of the first surface.

6. The magnetic disk drive according to claim 1, further comprising a magnetic disk of 26 to 28 mm in diameter.

7. The magnetic disk drive according to claim 6, wherein the short sides of the first surface are each about 30 mm long and the long sides thereof are each about 40 mm long.

8. A magnetic disk drive comprising:
a housing having a first rectangular surface and first and second columnar protrusions formed on the first rectangular surface; and
a rectangular circuit board comprising two sets of parallel edges and having a first circular aperture;
wherein the center of the first protrusion lies on a short side center line parallel to the short sides of the first surface or at a position deviated from the short side center line,
wherein the center of the second protrusion lies on a long side center line parallel to the long sides of the first surface or at a position deviated from the long side center line on the side opposite to the side where the center of the first protrusion is positioned,
wherein the circuit board is fixed to the first surface of the housing in a mutually fitted state of the first aperture and the second protrusion,
wherein a first circuit, housed within a package and which includes a hard disk controller, an MPU, a read/write channel, and a motor drive unit, is provided on the circuit board on the side where the center of the second protrusion is positioned with respect to the short side center line parallel to the short sides of the first surface and on the side opposite to the side where the center of the second protrusion is positioned with respect to the long side center line parallel to the long sides of the first surface, and
wherein a single connecting terminal for connection between the hard disk controller and an external host is provided on the circuit board in the longitudinal direction of the first surface on the side where the center of the second protrusion is positioned with respect to the center of the first protrusion, and
wherein a second circuit is disposed on the circuit board in such a manner that an extension line in a direction of a straight edge of the package intersects one of the edges of the circuit board obliquely.

9. The magnetic disk drive according to claim 8, wherein the first protrusion is for accommodating a spindle motor within the housing, while the second protrusion is for accommodating a bearing portion of a rotary shaft of an actuator within the housing.

10. The magnetic disk drive according to claim 8, wherein the circuit board is provided so as to cover a part of the first surface.

11. The magnetic disk drive according to claim 8, wherein the connecting terminal is disposed on the circuit board on the side where the center of the second aperture is positioned with respect to the short side center line parallel to the short sides of the first surface and on the side where the center of the second aperture is positioned with respect to the long side center line parallel to the long sides of the first surface.

12. The magnetic disk drive according to claim 11, wherein the circuit board is provided so as to cover the first surface on only the side where the center of the second protrusion is positioned rather than the center of the first protrusion in the longitudinal direction of the first surface.

13. The magnetic disk drive according to claim 8, wherein test pads for the first circuit are provided in a region on the circuit board to be positioned between an edge close to the first circuit in the longitudinal direction of the first surface and the first circuit.

14. The magnetic disk drive according to claim 8, further comprising a magnetic disk of 26 to 28 mm in diameter.

15. The magnetic disk drive according to claim 14, wherein the short sides of the first surface are each about 30 mm long and the long sides thereof are each about 40 mm long.

* * * * *

UNITED STATES PATENT AND TRADEMARK OFFICE
CERTIFICATE OF CORRECTION

| | |
|---|---|
| PATENT NO. | : 8,035,915 B2 |
| APPLICATION NO. | : 11/317510 |
| DATED | : October 11, 2011 |
| INVENTOR(S) | : Kotani et al. |

It is certified that error appears in the above-identified patent and that said Letters Patent is hereby corrected as shown below:

On the title page, item (54) and in the specification, column 1, lines 1-4, Delete "Magnetic Disk Drive Having Circuit Board Apertures Fitted With Protrusions To Achieve Efficient Layout Of Circuit Elements"
    Replace with "MAGNETIC DISK DRIVE WITH EFFICIENT LAYOUT OF CIRCUIT ELEMENTS"

Signed and Sealed this
Sixteenth Day of April, 2013

Teresa Stanek Rea
*Acting Director of the United States Patent and Trademark Office*